(12) United States Patent
Talingting-Pabalan et al.

(10) Patent No.: US 7,786,179 B2
(45) Date of Patent: Aug. 31, 2010

(54) DEMULSIFIERS IN SOLVENT BASE FOR SEPARATING EMULSIONS AND METHODS OF USE

(75) Inventors: Ruela Talingting-Pabalan, Burlington, NJ (US); Gary Woodward, Northwich Cheshire (GB); Manilal S. Dahanayake, Princeton Junction, NJ (US); Herve Adam, Clarksburg, NJ (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 12/319,440

(22) Filed: Jan. 7, 2009

(65) Prior Publication Data

US 2009/0149557 A1 Jun. 11, 2009

Related U.S. Application Data (63) Continuation-in-part of application No. 12/191,130, filed on Aug. 13, 2008, now Pat. No. 7,671,099.

(60) Provisional application No. 60/955,551, filed on Aug. 13, 2007.

(51) Int. Cl.
*B01D 17/05* (2006.01)
(52) U.S. Cl. .................. 516/181; 516/182; 516/191
(58) Field of Classification Search ............... 516/181
See application file for complete search history.

(56) References Cited

U.S. PATENT DOCUMENTS

| | | | |
|---|---|---|---|
| 2,549,435 A | 4/1951 | De Groot et al. | |
| 3,756,959 A * | 9/1973 | Vitalis et al. | 516/154 |
| 4,129,508 A * | 12/1978 | Friihauf | 508/399 |
| 5,674,823 A * | 10/1997 | Ricca et al. | 510/102 |
| 6,207,058 B1 * | 3/2001 | Ventura et al. | 210/651 |
| 6,294,093 B1 | 9/2001 | Selvarajan et al. | 210/708 |
| 6,476,168 B1 | 11/2002 | Dahanayake et al. | |
| 6,599,949 B2 | 7/2003 | Varadaraj et al. | 516/160 |
| 6,677,293 B1 | 1/2004 | Allgaier et al. | |
| 6,846,798 B2 | 1/2005 | Joye et al. | |
| 2002/0161059 A1 | 10/2002 | Varadaraj et al. | 516/113 |
| 2006/0135628 A1 * | 6/2006 | Newman et al. | 516/156 |
| 2006/0135683 A1 | 6/2006 | Adam et al. | 524/556 |
| 2006/0260815 A1 | 11/2006 | Dahanayake et al. | 166/308.6 |

FOREIGN PATENT DOCUMENTS

DE 00/12660 3/2000

OTHER PUBLICATIONS

FM Ghuiba & O M O Habib, H kH Gharieb & B M Badran; "The Use of Egyptian Fusel Oil for the Preparation of Some Plasticizers Compatible with Polyvinyl Chloride"; Indian Journal of Technology, vol. 23, Aug. 1985, pp. 309-311.

* cited by examiner

*Primary Examiner*—Ling-Siu Choi
*Assistant Examiner*—Chun-Cheng Wang
(74) *Attorney, Agent, or Firm*—Kevin McVeigh; Jericho Pacho; Cozen O'Connor

(57) ABSTRACT

Demulsifiers containing an anionic surfactant selected from alkylsulfosuccinates, alkylphosphonic acids, and their salts; a nonionic surfactant selected from ethylene oxide/propylene oxide copolymers, ethoxylated fatty acids of polyethylene glycol, terpene alkoxylates, and modified alkanolamides; and solvent bases comprising blends of dibasic esters. Methods for breaking emulsions using such demulsifiers and solvent bases are also disclosed.

40 Claims, 2 Drawing Sheets

FIG. 1: Evaluation of demulsifiers at various concentration levels (See Table 1 for ID #'s designating the demulsifiers used in the study)

FIG. 2: Amount of water in oil layer after separation (See Table 1 for the designation of x-axis demulsifiers)

DEMULSIFIERS IN SOLVENT BASE FOR SEPARATING EMULSIONS AND METHODS OF USE

CROSS REFERENCE TO RELATED APPLICATIONS

This application is a continuation-in-part application of U.S. patent application Ser. No. 12/191,130, filed Aug. 13, 2008 U.S. Pat. No. 7,671,099, which claims priority from U.S. Provisional Patent Application Ser. No. 60/955,551, filed Aug. 13, 2007.

FIELD OF THE INVENTION

The present invention generally relates to water-in-oil and oil-in-water demulsifiers and their corresponding solvent bases, which comprise a demulsifying composition having low toxicity and are environmentally friendly for use in breaking emulsions in crude oil. More specifically, the invention relates to formulations comprising an anionic surfactant and a nonionic surfactant in solvent bases comprising blends of dibasic acid esters.

BACKGROUND OF THE INVENTION

Natural resources such as gas, oil, minerals, and water residing in subterranean formations can be recovered by drilling wells in the formations. Emulsions comprising oil and water commonly occur in the extraction, production, and processing and refining of oil. It is often necessary to separate the water from the oil in order to effectively prepare the oil for further processing or refinement. Numerous demulsifiers are known in the art for removing water from such emulsions.

Demulsifiers are typically composed of one or more surfactants dispersed in a solvent system and may be derived, for example, from alcohols, fatty acids, fatty amines, glycols, and alkylphenol condensation products. The solvent systems, in turn, generally comprise aromatic distillates, including for example 1,2-Dimethylbenzene, 1,3-Dimethylbenzene and 1,4-Dimethylbenzene, which may pose adverse health effects and are not environmentally friendly. In particular, such solvents may have high VOC (Volatile Organic Compound) content, which may be non-compliant with current VOC regulations. Such solvent systems, which comprise aromatic-based solvents, are increasingly being disfavored while alternative "green" or environmentally friendly solvents are becoming more preferred for use in various applications. Therefore, a need exists for solvent bases for use in demulsifying applications that will less adversely impact the environment, human health, etc., such as by having lower toxicity levels and VOC content.

Among the crude oil demulsification methods in use today, electrostatic separation, gravity separation, centrifugation, and hydrocyclone-assisted separation are frequently used. In such methods, wash water is added until the crude oil's water content is in the range of about 4% to about 15% by volume, and a chemical demulsifier formulation is added so that the oil and the aqueous phases can be separated by separation methods known in the art.

Effective demulsification requires addition of a chemical demulsifying composition to the wash water or to the crude prior to application of an electrostatic field or centrifugal force to the crude oil emulsion. Crude oils that contain high amounts of asphaltenes and naphthenic acids are generally called heavy crude oils and are difficult to demulsify. These crude oils require specifically tailored demulsifiers for demulsification to be effective. Many demulsifiers have phenolic groups in their chemical structure. Likewise, many solvent bases in which such demulsifiers are mixed or dispersed have benzyl or phenyl groups. In some cases, demulsifiers and solvent bases that do not contain such groups, and which are effective on crude oils containing asphaltenes and naphthenic acids, are desired.

The ecological impact of offshore crude oil extraction increasingly receives attention and is the subject of scrutiny by regulatory agencies as well as the public. Environmental regulatory agencies, both national and international, have determined that demulsifiers containing nonylphenyl alkoxylates and related compounds have a deleterious effect on the marine environment. Therefore, a need exists for crude oil demulsifiers that will less adversely impact the environment, such as by having lower toxicity levels, especially in the marine environment.

U.S. Patent Application Publication No. 2006/0135628 to Newman et al., Jun. 22, 2006, provides demulsifier formulations comprising poly(tetramethylene glycol) and an alkylene glycol copolymer linked to the poly(tetramethylene glycol) by a difunctional coupling agent. U.S. Pat. No. 6,294,093 to Selvarajan et al., Sep. 25, 2001, provides aqueous demulsifier formulations with reduced toxicity or flammability. U.S. Patent Application Publication No. 2002/0161059 to Varadaraj et al., Oct. 31, 2002, discloses a demulsifier formulation comprising an alkyl aromatic sulfonic acid additive for desalting crude oil. U.S. Pat. No. 6,599,949 to Varadaraj et al., Jul. 29, 2003, discloses aromatic sulfonic acid demulsifier formulations, specifically an alkyl aromatic sulfonic acid additive and a solvent co-additive. U.S. Patent Application Publication No. 2006/0260815 to Dahanayake et al., Nov. 23, 2006, discloses self-degrading foaming compositions comprising an anionic surfactant and a nonionic surfactant, including sulfosuccinates and sulfosuccinamates. International Application Publication No. WO 2000/012660 to Forschungszentrum Jülich GMBH, Mar. 9, 2000, describes a method for increasing the efficiency of surfactants by adding a block copolymer. Generally polymeric demulsifiers are used at higher levels.

Thus, there is a need for improved environmentally friendly demulsifying compositions containing low levels of surfactants in environmentally friendly solvent bases.

SUMMARY OF THE INVENTION

It has been unexpectedly found that demulsifyiers containing alkylsulfosuccinates, alkylphosphonic acids, and their salts work effectively at low concentrations. It has also been unexpectedly found that incorporating such demulsifiers in certain solvent bases disclosed in this application increase or enhance the performance of such demulsifiers.

In one aspect, the present invention is a demulsifying composition comprising (a) a demulsifier generally comprising one or more anionic surfactants and/or one or more non-ionic surfactants; and (b) a solvent base comprising a blend of dibasic esters.

In another aspect, the present invention is a demulsifying composition comprising: (a) an anionic surfactant selected from the group consisting of alkylsulfosuccinates, alkylphosphonic acids, salts thereof, and combinations thereof; (b) a nonionic surfactant selected from the group consisting of ethylene oxide/propylene oxide copolymers, ethoxylated fatty acid esters of polyethylene glycol, terpene alkoxylates, modified alkanomides, and combinations thereof; and (c) a solvent base composition comprising a blend of dibasic esters, wherein the blend comprises either (i) a blend of alkylesters of adipic, glutaric, and succinic diacids or (ii) isomers of an alkyl adipate.

In some embodiments the anionic surfactant is present from about 5% to about 95% by weight of the total surfactant, while in other embodiments the nonionic surfactant is present from about 5% to about 95% by weight of the total surfactant.

Typically, the anionic surfactant comprises alkylphosphonic acid, laurylphosphonic acid, salts thereof, or combinations thereof. More typically, the anionic surfactant is sodium dialkylsulfosuccinate.

Typically, the nonionic surfactant comprises an ethylene oxide/propylene oxide copolymer selected from ethylene oxide/propylene oxide alkoxylates, ethylene oxide/propylene oxide block copolymers, or ethylene oxide/propylene oxide reverse copolymers.

Typically, the solvent base composition comprises adducts of alcohol and linear diacids, the adducts having the formula $R^7$—OOC-A-COO—$R^7$ wherein $R^7$ individually comprises a $C_1$-$C_8$ alkyl group and, more typically, ethyl, methyl, residues of at least one linear alcohol having 4 carbon atoms, or at least one linear or branched alcohol having at least 5 carbon atoms, and A is a mixture of —$(CH_2)_4$—, —$(CH_2)_3$, and —$(CH_2)_2$—.

In a further embodiment, the solvent base composition comprises adducts of linear and/or branched diacids, the adducts having the formula $R^3$—OOC-A-COO—$R^4$ wherein $R^3$ and $R^4$ are the same or different alkyl groups, typically, a $C_1$-$C_8$ alkyl group, more typically, methyl, ethyl, propyl, isopropyl, butyl, isobutyl, n-butyl or isoamyl, where A is a branched or linear hydrocarbon. Typically, A are isomers of hydrocarbon groups having 4 carbons.

In another aspect, the present invention comprises a demulsifying composition comprising: (a) either (i) an anionic surfactant selected from the group consisting of alkylsulfosuccinates, alkylphosphonic acids, salts thereof, and combinations thereof, or (ii) a nonionic surfactant selected from the group consisting of ethylene oxide/propylene oxide copolymers, ethoxylated fatty acids of polyethylene glycol, terpene alkoxylates, and combinations thereof; and (b) a solvent base composition comprising a blend of dibasic esters. In one embodiment, the anionic surfactant is sodium dialkylsulfosuccinate, octylphosphonic acid, laurylphosphonic acid, salts thereof, and combinations thereof.

In one embodiment, the blend comprises:

about 9-11% by weight of the blend a diester of the formula:

about 86-89% by weight of the blend a diester of the formula about 1-3% by weight of the blend a diester of the formula wherein R is methyl, ethyl, propyl, isopropyl, butyl, isobutyl, n-butyl or isoamyl.

In another embodiment, the blend comprises:

about 20-28% by weight of the blend a diester of the formula:

about 59-67% by weight of the blend a diester of the formula:

about 9-17% by weight of the blend a diester of the formula:

wherein R is methyl, ethyl, propyl, isopropyl, butyl, isobutyl, n-butyl or isoamyl.

In a further aspect, the present invention is a method for breaking an emulsion of oil and water comprising: contacting the emulsion with a demulsifying composition comprising (a) an anionic surfactant selected from the group consisting of alkylsulfosuccinates, alkylphosphonic acids, salts thereof, and combinations thereof; (b) a nonionic surfactant selected from the group consisting of ethylene oxide/propylene oxide copolymers, ethoxylated fatty acids of polyethylene glycol, terpene alkoxylates, modified alkanolamides, and combinations thereof; and (c) a solvent base composition comprising a blend of dibasic esters described herein.

In yet another aspect, the present invention is a method for breaking an emulsion of oil and water comprising contacting the emulsion with (a) a demulsifier comprising either (i) an anionic surfactant selected from the group consisting of alkylsulfosuccinates, alkylphosphonic acids, salts thereof, and combinations thereof, or (ii) a nonionic surfactant selected from the group consisting of ethylene oxide/propylene oxide copolymers, ethoxylated fatty acids of polyethylene glycol, terpene alkoxylates, and combinations thereof; and (b) a solvent base composition comprising a blend of dibasic esters described herein.

In one embodiment, the anionic surfactant is sodium dialkylsulfosuccinate. In another embodiment, the nonionic surfactant is an ethylene oxide/propylene oxide copolymer selected from the group consisting of ethylene oxide/propylene oxide alkoxylates, ethylene oxide/propylene oxide block copolymers, and ethylene oxide/propylene oxide reverse copolymers.

DETAILED DESCRIPTION OF THE INVENTION

The present invention generally relates to crude oil demulsifying compositions (also known as "emulsion breakers") and for resolving or otherwise "breaking" emulsions that typically form during crude oil extraction or refinement. More specifically, the present invention generally relates to water-in-oil demulsifiers having low toxicity and comprising one or more of an anionic surfactant and/or a nonionic surfactant in a solvent base comprising a blend of dibasic esters.

To aid in the understanding of the invention, the following non-limiting definitions are provided.

As used herein, "emulsion" shall mean a composition, usually liquid or gelled, comprising two or more immiscible phases in which a first phase (the "dispersed phase") is dispersed in a second phase (the "continuous phase"). Oil and water emulsions include water-in-oil emulsions (water dispersed in oil) and oil-in-water emulsions (oil dispersed in water). As used herein, any reference to "emulsion" shall be interpreted to apply equally to both water-in-oil and oil-in-water emulsions. Also as used herein, the term "inverse emulsion" refers to an oil-in-water emulsion.

The terms "surfactant" and "emulsifier" are interchangeable and generally refer to a wetting agent that lowers the surface or interfacial tension between two liquids. Using surfactants allows obtaining the dispersion of one phase in the other.

As used herein, the term "demulsifier" shall mean a surfactant or combination of surfactants that inhibits or prevents dispersion in an emulsion, thereby permitting the immiscible substances to be more readily separated from one another.

The term "emulsion breaking" shall refer to the process of disrupting the stable surface between the continuous phase and dispersed phase of an emulsion. It is generally accepted that high molecular weight surfactants and water soluble polymers will displace lower molecular weight surfactants at a surface boundary. "Emulsion breakers" are designed to be similar in chemistry to emulsifying surfactants but have a significantly higher molecular weight, allowing them to disrupt the surface layer and destabilize the emulsion. See, e.g., Brady, J. E. and G. E. Humiston, *General Chemistry, Principles and Structure*, John Wiley and Sons, Inc., New York (1982).

As used herein, the term "oil" shall refer to and be interchangeable with "crude oil" or "petroleum."

The term "water" is used herein to mean water to prepare demulsifiers and water present in oil-emulsions. In addition, water may contain dissolved organic salts, organic acids, organic acid salts, inorganic salts, or combinations thereof. Examples are potassium chloride, ammonium chloride, and trimethylammonium chloride. The term "salt water" is used herein to mean unsaturated salt solutions and saturated salt solutions including brines and seawater.

"Water clarification" is the removal of non-complying substances (e.g. crude oil) from water prior to disposal. Oil may be removed using a combination of demulsifiers and mechanical methods as disclosed herein. Demulsifiers are evaluated by inversion testing and closed bottle testing of crude oils. Measure of water clarity is obtained by treating the produced water using chemistry-in-bottle testing, bench model float-cell testing, and jar testing to determine optimum demulsification. Measure of water clarity can be made visually, by spectroscopic methods, by turbidimetric methods, or by any other methods known to persons skilled in the art. Oil clarity can be measured by determining the water content by conductometric methods, Karl Fischer methods, or any other methods known to persons skilled in the art. In selecting demulsifiers, it is important that the discharge water meets process effluent specifications.

Surfactants are used in a demulsifying composition to coalesce the oil droplets. While not bound by any theory it is believed that surfactants disrupt the oil-water interface and allow combination of smaller oil droplets to larger oil droplets and aid in their separation from water. Useful surfactants include anionic and nonionic compounds, which may be used separately or as a mixture in one or more solvent bases. Anionic and nonionic surfactants are added in concentrations that range typically from about 50 parts per million ("ppm") to about 10,000 ppm of the liquid component volume and more typically from about 125 ppm to about 2000 ppm of the liquid component volume. The surfactants of the present invention may be used individually or in mixtures in one or more solvent bases.

The demulsifiers for use in the demulsifying composition of the present invention may be used to prevent, break, or resolve water-in-oil or oil-in-water type emulsions, typically crude oil emulsions. These demulsifiers may also be used to break hydrocarbon emulsions derived from refined mineral oil, gasoline, kerosene, etc. The present demulsifiers and/or demulsifying compositions may be applied at any point during the petroleum oil extraction and/or production process as is commonly known in the art. For instance, the present demulsifiers may be introduced at the well head; via downhole injection, either continuously or periodically; or at any point between the wellhead and the final oil storage.

In one embodiment the demulsifier comprises: an anionic surfactant selected from the group consisting of alkylsulfosuccinates, alkylphosphonic acids, and salts thereof; and a nonionic surfactant selected from the group consisting of ethylene oxide/propylene oxide copolymers, ethoxylated fatty acids of polyethylene glycol, terpene alkoxylates and modified alkanolamides. Combinations of surfactants may also be used in the present invention. In specific embodiments, the anionic surfactant may be present in amounts from about 5% to about 95% by weight of the total surfactant, and the nonionic surfactant may be present in amount from about 5% to about 95% by weight by weight of the total surfactant. In some embodiments the anionic surfactant is present from about 10% to about 80% by weight by weight of the total surfactant and the nonionic surfactant is present from about 10% to about 80% by weight by weight of the total surfactant.

Anionic Surfactants

Anionic surfactants useful in the demulsifier composition of the present invention include but are not limited to alkylsulfosuccinates, alkyl phosphate esters, alkylphosphonic acids, and their salts, and combinations thereof. Typical anionic surfactants are sulfosuccinates such as sodium dialkylsulfosuccinate, which may be used as the anionic surfactant in either powder form or in solution. In other embodiments of the invention, the anionic surfactant may be: alkylphosphonic acids with an alkyl group of from about 5 to 15 carbon atoms, and which may be branched or linear, saturated or unsaturated; a laurylphosphonic acid, salts of such alkylphosphonic acids, salts of laurylphosphonic acid, and combinations thereof. In one embodiment, the alkylphosphonic acid is a product sold under the trade name Rhodafac ASI (Rhodia Inc., Cranbury, N.J.).

Suitable anionic surfactants include the following structural formulas:

Alkyl Phosphonic Acid and Salts $$R^1PO_3M \qquad (I)$$

In the above structure, $R^1$ is an alkyl and may be branched or linear; "M" is hydrogen, an alkali metal such as sodium or potassium, or an ammonium salt; $R^1$ typically contains 5 to 20 carbon atoms, more typically 5 to 16 atoms, most typically 8 to 12 carbon atoms.

Alkylsulfosuccinates (II)

In the above structure $R^2$ is selected from the group consisting of alkyl, —$CH_2CH_2OH$, aryl, alkaryl, alkoxy, alkylarylalkyl, arylalkyl, alkylamidoalkyl and alkylaminoalkyl. In embodiments in which $R^2$ represents alkyl, the group typically has about 5 to about 20 carbon atoms and more typically has about 10 to about 18 carbon atoms. In embodiments in which $R^2$ represents aryl, the group typically comprises a phenyl, diphenyl, diphenylether, or naphthalene moiety. "M" is hydrogen, an alkali metal such as sodium or potassium, or an ammonium salt. "M" is typically an alkali metal such as sodium or potassium, more typically sodium.

Nonionic Surfactants

Nonionic surfactants for use in the demusifying composition of the present invention include but are not limited to linear copolymers, block copolymers, and reverse copolymers of ethylene oxide/propylene oxide; ethoxylated fatty acids of polyethylene glycol/polypropylene glycol; fatty acid esters; glycerol esters; ethoxylated fatty acids esters of glycol; ethoxylated fatty acid esters of polyethylene glycol; terpene alkoxylates, modified alkanolamides and sorbitan esters.

Typical nonionic surfactants are ethylene oxide/propylene oxide copolymers, ethoxylated fatty acids esters of glycol, ethoxylated fatty acid esters of polyethylene glycol, alcohol ethoxylates, terpene alkoxylates and modified alkanomides. More typical nonionic surfactants are ethylene oxide/propylene oxide copolymers, ethoxylated fatty acid esters of polyethylene glycol, terpene alkoxylates, and combinations thereof.

Suitable non-ionic surfactants include the surfactants having the structural formulas as shown below. Suitable ethylene oxide/propylene oxide copolymers may be selected from the group consisting of ethylene oxide/propylene oxide block copolymers, ethylene oxide/propylene oxide alkoxylates, and ethylene oxide/propylene oxide reverse copolymers Ethyleneoxide/Propyleneoxide Block Copolymer Surfactant (III)

In one embodiment, "o," "m," and "n" are from about 1 to about 50. In an alternative embodiment, the nonionic surfactant is the product sold under the trade name ANTAROX® L-64 (Rhodia Inc., Cranbury, N.J.).

Ethyleneoxide/Propyleneoxide Reverse Copolymer Surfactant (IV)

In one embodiment "m" is from about 10 to 60 and "n" is about 0 to about 15. In another embodiment, "m" is from about 20 to about 40, and "n" is from about 4 to about 15. In an alternative embodiment, the nonionic surfactant is the product sold under the trade name ANTAROX® 31R1 (Rhodia Inc., Cranbury, N.J.).

Ethylene Oxide/Propylene Oxide Alkoxylates (V)

In one embodiment, "d" is from about 1 to about 10 and "e" is from about 1 to about 50. $R^3$ is a hydrocarbon chain hydrocarbon chain typically containing from about 1 to about 22 carbon atoms, more typically from about 8 to about 14 carbon atoms, and may be branched or straight-chained and saturated or unsaturated.

In another embodiment, "d" is from about 2 to about 8 and "e" is from about 5 to about 12. In an alternative embodiment, the nonionic surfactant is the product sold under the trade name ANTAROX® BL-14 (Rhodia Inc., Cranbury, N.J.).

Ethoxylated Fatty Acid Esters of Polyethylene Glycol (VI)

(VII)

In some embodiments $R^4$ is a hydrogen or a hydrocarbon chain containing about 10 to about 22 carbon atoms and may be branched or straight-chained and saturated or unsaturated and is selected from the group consisting of hydrogen, alkyl, alkoxy, aryl, alkaryl, alkylarylalkyl, arylalkyl, alkylamidoalkyl, and alkylaminoalkyl. $R^5$ is typically a hydrocarbon chain containing about 1 to about 22 carbon atoms and may be branched or straight-chained and saturated or unsaturated and is selected from the group consisting of alkyl, alkoxy, aryl, alkaryl, alkylarylalkyl, arylalkyl, alkylamidoalkyl, and alkylaminoalkyl. In embodiments in which $R^4$ and $R^5$ represent alkyl, the groups typically have about 5 to about 20 carbon atoms and more typically have about 10 to about 18 carbon atoms. In embodiments in which $R^4$ and $R^5$ represent aryl, the groups typically comprise a phenyl, diphenyl, diphenylether, or naphthalene moiety. In referred embodiments "x" is from about 1 to about 20. In certain embodiments the structures are mono and diesters.

In an alternative embodiment, the nonionic surfactants are the products of dioleate ester of PEG 400, sold under the trade name ALKAMUS® 400DO (Rhodia Inc., Cranbury, N.J.).

Terpene Alkoxylates

Terpene alkoxylates are terpene-based surfactants derived from a renewable raw materials such as α-pinene and □ pinene, and have a C-9 bicyclic alkyl hydrophobe and polyoxy alkylene units in an block distribution or intermixed in random or tapered distribution along the hydrophilic chain. The terpene alkoxylate surfactants are described in the U.S. Patent Application Publication No. 2006/0135683 to Adam et al., Jun. 22, 2006, is incorporated herein by reference.

Typical terpene alkoxylates are Nopol alkoxylate surfactants and have the general formula:

(VIII)

(IX)

where $R^6$ and $R^7$ are, individually, hydrogen, $CH_3$, or $C_2H_5$; "n" is from about 1 to about 30; "m" is from about 0 to about 20; and "p" is from about 0 to 20. The "n", "m" and/or "p" units may be of block distribution or intermixed in random or tapered distribution along the chain.

In another embodiment, $R^6$ is $CH_3$; "n" is from about 20 to about 25; "m" is from about 5 to about 10. In yet another embodiment, $R^6$ and $R^7$ are individually $CH_3$; "n" is from about 1 to about 8; "m" is from about 2 to about 14; and "p" is from about 10 to about 20.

In an alternative embodiment, the nonionic surfactant is the product sold under the trade name RHODOCLEAN® HP (Rhodia Inc., Cranbury, N.J.).

Alcohol Ethoxylates (X)

Typically, $R^7$ is a hydrogen or a hydrocarbon chain containing about 5 to about 25 carbon atoms, more typically from about 7 to about 14 carbon atoms, most typically, from about 8 to about 13 carbon atoms, and may be branched or straight-chained and saturated or unsaturated and is selected from the group consisting of hydrogen, alkyl, alkoxy, aryl, alkaryl, alkylarylalkyl and arylalkyl. Typically, "n" is an integer from about 1 to about 30, more typically an integer from 2 to about 20, and most typically an integer from about 3 to about 12.

In an alternative embodiment, the alcohol ethoxylate is sold under the trade name Rhodasurf 91-6 (Rhodia Inc., Cranbury, N.J.).

Modified Alkanolamides

The demulsifiers of the demulsifying composition of the present invention may contain modified alkanolamides as non ionic surfactant. In one embodiment, the modified alkanolamide is the product sold under the trade name ANTAROX AG 5 (Rhodia Inc., Cranbury, N.J.).

Demulsifiers of the present invention may be used alone or in combination with any of a number of additional demulsifiers described herein or known in the art including but not limited to alkylphenol formaldehyde condensation products such as alkylphenol formaldehyde, resin alkoxylates, polyalkylene glycols including polypropylene glycols and cross-linked polypropylene glycols, organic sulfonates, alkoxylated alcohols, alkoxylated polyols, fatty acids, complex resin esters, alkoxylated fatty amines, alkoxylated polymeric amines, and the like. Thus, for example, the demulsifier may comprise an alkylsulfosuccinate such as sodium dialkylsulfosuccinate and an ethylene oxide/propylene oxide copolymer. Alternatively, as an example, the demulsifier may comprise an alkylsulfosuccinate and an ethoxylated fatty acid of ethylene glycol.

The demulsifiers of the present invention may also be used in combination with corrosion inhibitors, viscosity reducers, and other chemical treatments used in crude oil production, refining, and chemical processing. Optionally, a variety of conventional additives that do not adversely affect the demulsifier performance can be used. For example, optional additives may include bactericides and the like.

In an embodiment of the invention, a demulsifier composition is prepared by mixing water with a surfactant comprising an anionic surfactant, a nonionic surfactant, or combinations thereof. The water utilized for forming the demulsifier of this invention can be fresh water or salt water. In addition the water may contain dissolved organic salts, organic acids, organic acid salts, inorganic salts, or combinations thereof.

Solvent Base

In one embodiment, the demulsifying composition contains a solvent base. Standard mixing procedures known in the art can be employed since heating of the solution and special agitation conditions are normally not necessary. Of course, if used under conditions of extreme cold such as found in Alaska or Siberia, normal heating procedures may be useful. Typically, the boiling point of the dibasic esters blend in certain embodiments of the invention is greater than 275° C.

According to one embodiment of the present invention, the blend of dibasic esters is typically derived from one or more by-products in the production of polyamide, for example, polyamide 6,6. In one embodiment, the solvent base of the present invention comprises a blend of esters of adipic diacids, glutaric diacids, and succinic diacids. In another embodiment, the solvent base of the present invention comprises a blend of esters of adipic diacids, methylglutaric diacids, and ethylsuccinic diacids.

According to one embodiment of the present invention, the blend of dibasic esters corresponds to one or more by-products in the preparation of adipic acid or hexamethylenediamine, which are monomers utilized in the manufacture of polyamide. For example, the esters are obtained by esterification of one of the by-products in the production/reaction of adipic acid, which generally contains, on a weight basis of the blend, from about 15% to about 33% succinic acid, from about 50% to about 75% glutaric acid and from about 5% to about 30% adipic acid. As another example, the dialkyl esters are obtained by esterification of one of the by-products in the production/reaction of hexamethylenediamine, which generally contains, on a weight basis, from about 30% to 95% methyl glutaric acid, from about 5% to 20% ethyl succinic acid and from about 1% to about 10% adipic acid. It is understood, however, that the acid portion may be derived from such dibasic acids such as adipic, succinic, glutaric, oxalic, malonic, pimelic, suberic and azelaic acids, as well as mixtures thereof.

In some embodiments the blend comprises adducts of alcohol and linear diacids, the adducts having the formula R—OOC-A-COO—R wherein R is ethyl, n-butyl or isoamyl and A is a mixture of —$(CH_2)_4$—, —$(CH_2)_3$—, and —$(CH_2)_2$—. In other embodiments, the blend comprises adducts of alcohol, typically ethanol, and linear diacids, the adducts having the formula $R^1$—OOC-A-COO—$R^2$, wherein at least part of $R^1$ and/or $R^2$ are residues of at least one linear alcohol having 4 carbon atoms, and/or at least one linear or branched alcohol having at least 5 carbon atoms, and wherein A is a divalent linear hydrocarbon. In some embodiments A is one or a mixture of —$(CH_2)_4$—, —$(CH_2)_3$—, and —$(CH_2)_2$—. In another embodiment, $R_1$ and $R_2$ individually comprise a hydrocarbon group having 3 to 8 carbon atoms; however, $R_1$ and $R_2$ do not individually comprise an iso-butyl group.

$R_1$ and $R_2$ can also individually comprise a glycol ether group. Typically, the glycol ether group comprises the formula:

wherein $R_5$ comprises H, or $C_1$-$C_{20}$ alkyl, aryl, alkylaryl or arylalkyl groups; "n" is an integer from 1 to 7; and $R_6$ comprises H or a methyl group. Typically, $R_5$ is a $C_1$-$C_{10}$ group, more typically, a $C_1$-$C_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In another embodiment, the $R_1$ and/or $R_2$ groups can be linear or branched, cyclic or noncyclic, $C_1$-$C_{20}$ alkyl, aryl, alkylaryl or arylalkyl groups. Typically, the $R_1$ and/or $R_2$ groups can be $C_1$-$C_8$ groups, for example groups chosen from the methyl, ethyl, n-propyl, isopropyl, n-butyl, isobutyl, n-amyl, n-hexyl, cyclohexyl, 2-ethylhexyl and isooctyl groups and their mixtures. For example, $R_1$ and/or $R_2$ can both or individually be ethyl groups, $R_1$ and/or $R_2$ can both or individually be n-propyl groups, $R_1$ and/or $R_2$ can both or individually be isopropyl groups, $R_1$ and/or $R_2$ can both or individually be n-butyl groups, $R^1$ or $R^2$ can individually be isobutyl groups, $R^1$ and/or $R^2$ can both or individually be n-amyl groups, or $R^1$ and/or $R^2$ can be mixtures thereof (e.g., when comprising a blend of dibasic esters).

In further embodiments the solvent base of the present invention include blends comprising adducts of branched diacids, these adducts having the formula $R^3$—OOC-A-COO—$R^4$, wherein $R^3$ and $R^4$ are the same or different alkyl groups and A is a branched or linear hydrocarbon. Typically, A comprises isomers of a $C_4$ hydrocarbon. Examples include those where $R^3$ and/or $R^4$ can be linear or branched, cyclic or noncyclic, $C_1$-$C_{20}$ alkyl, aryl, alkylaryl or arylalkyl groups. Typically, $R^3$ and $R^4$ are independently selected from the group consisting of methyl, ethyl, propyl, isopropyl, butyl, n-butyl, iso-butyl, iso-amyl, and fusel oil.

Compounds deriving from fusel oil are known and have been described, for example, in "The Use of Egyptian Fusel Oil for the Preparation of Some Plasticizers Compatible with Polyvinyl Chloride", Chuiba et al., Indian Journal of Technology, Vol. 23, August 1985, pp. 309-311, which describes a reaction product of a fusel oil having a boiling point of 110 to 136° C. and of pure adipic or sebacic acid.

$R_3$ and $R_4$ can also individually comprise a glycol ether group. Typically, the glycol ether group comprises the formula:

wherein $R_5$ comprises H, or $C_1$-$C_{20}$ alkyl, aryl, alkylaryl or arylalkyl groups; "n" is an integer from 1 to 7; and $R_6$ comprises H or a methyl group. Typically, $R_5$ is a $C_1$-$C_{10}$ group, more typically, a $C_1$-$C_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In yet another embodiment, the solvent base of the present invention comprises a composition based on dicarboxylic acid diester(s) of formula R5-OOC-A-COO—R6 wherein group A represents a divalent alkylene group typically in the range of, on average, from 2.5 to 10 carbon atoms. R5 and R6 groups, which can be identical or different, represent a linear or branched, cyclic or noncyclic, C1-C20 alkyl, aryl, alkylaryl or an arylalkyl group.

In certain more specific embodiments, the blend comprises:

a diester of formula I:

a diester of formula II:

a diester of formula III:

$R_1$ and/or $R_2$ can individually comprise a hydrocarbon having from about 1 to about 8 carbon atoms, typically, methyl, ethyl, propyl, isopropyl, butyl, isobutyl, n-butyl or isoamyl. In addition, $R_1$ and/or $R_2$ can individually comprise a hydrocarbon group originating from fusel oil.

$R_1$ and $R_2$ can also individually comprise a glycol ether group. Typically, the glycol ether group comprises the formula:

wherein $R_5$ comprises H, or $C_1$-$C_{20}$ alkyl, aryl, alkylaryl or arylalkyl groups; "n" is an integer from 1 to 7; and $R_6$ comprises H or a methyl group. Typically, $R_5$ is a $C_1$-$C_{10}$ group, more typically, a $C_1$-$C_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In the above embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. Mention may also be made of Rhodiasolv® RPDE (Rhodia Inc., Cranbury, N.J.), Rhodiasolv® DIB (Rhodia Inc., Cranbury, N.J.) and Rhodiasolv® DEE (Rhodia Inc., Cranbury, N.J.).

In certain other embodiments, the blend comprises:
a diester of the formula IV:

(IV)

a diester of the formula V:

(V)

a diester of the formula VI:

(VI)

$R_1$ and/or $R_2$ can individually comprise a hydrocarbon having from about 1 to about 8 carbon atoms, typically, methyl, ethyl, propyl, isopropyl, butyl, isobutyl, n-butyl, or isoamyl. In addition, $R_1$ and/or $R_2$ can individually comprise a hydrocarbon group originating from fusel oil $R_1$ and $R_2$ can also individually comprise a glycol ether group. Typically, the glycol ether group comprises the formula:

wherein $R_5$ comprises H, or $C_1$-$C_{20}$ alkyl, aryl, alkylaryl or arylalkyl groups; "n" is an integer from 1 to 7; and $R_6$ comprises H or a methyl group. Typically, $R_5$ is a $C_1$-$C_{10}$ group, more typically, a $C_1$-$C_6$ group, including but not limited to methyl, ethyl, n-propyl, isopropyl, n-butyl, isobutyl, n-amyl or n-hexyl. Typically, "n" is an integer between 1 to 5, and more typically, "n" is the integer 1 or 2.

In the above embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI.

More typically, blend typically comprises (by weight of the blend): (i) from about 6% to about 12% of the diester of formula IV, (ii) from about 86% to about 92% of the diester of formula V, and (iii) from about 0.5% to about 4% of the diester of formula VI. Most typically, the blend comprises (by weight of the blend): (i) about 9% of the diester of formula IV, (ii) about 89% of the diester of formula V, and (iii) about 1% of the diester of formula VI. Mention may be made of Rhodiasolv® IRIS (Rhodia Inc., Cranbury, N.J.) and Rhodiasolv® DEE/M (Rhodia Inc., Cranbury, N.J.).

While in some embodiments, the solvent base comprises a blend of dibasic esters, it is understood that the solvent base can comprise additional components such as additives and other solvents, so long as such additional components do not adversely affect the demulsifier performance.

The following examples in which all parts and percentages are by weight unless otherwise indicated are presented to illustrate a few, but not all, embodiments of the invention.

In one embodiment of the invention the initial pH of the demulsifying composition may be lowered or raised to impart stability. The decrease of pH may be by brought about by adding acid and/or buffers. Similarly, it may be suitable to add a base and/or buffers to increase the pH of the demulsifier composition.

The present invention further provides a method for breaking an emulsion comprising oil and water. The method includes contacting the emulsion with any of the demulsifiers described herein or any combinations of such demulsifiers, in any solvent base described herein. Consequently, in one embodiment, the method comprises contacting the emulsion with a demusifying composition comprising (a) an anionic surfactant selected from the group consisting of alkylsulfosuccinates, alkylphosphonic acids, and salts of alkylphosphonic acids; (b) a nonionic surfactant selected from the group consisting of ethylene oxide/propylene oxide copolymers, ethoxylated fatty acids of polyethylene glycol, terpene alkoxylates, and modified alkanolamides; and (c) a solvent base composition comprising a blend of dibasic esters. The dibasic esters can comprise any of the blends described herein, typically, (i) alkylesters of adipic, glutaric and succinic diacids or (i) isomers of alkyl adipate.

For example, the method may include contacting an emulsion with a demulsifying composition composed of an alkylsulfosuccinate such as sodium dialkylsulfosuccinate and an ethylene oxide/propylene oxide copolymer in a blend of dimethyl methyl glutarate, dimethyl ethyl succinate and dimethyl adipate. Alternatively, the method may also include contacting the emulsion with the demulsifier composed of an alkylsulfosuccinate and an ethoxylated fatty acid of ethylene glycol.

EXAMPLES

The following examples are presented to illustrate the preparation and properties of demulsifier compositions and should not be construed to limit the scope of the invention, unless otherwise expressly indicated in the claims.

To determine the potential for novel demulsifiers for inverse crude oil emulsions, several existing products from Rhodia Inc. (Cranbury, N.J.) were screened and compared to existing commercial crude oil demulsifiers. Products tested include those sold under the trade names RHODOCLEAN HP, ANTAROX BL225, RHODASURF 91-6, GEROPON SDS, GEROPON GR/7, SOPROPHOR BSU, SOPROPHOR S/40P, ANTAROX L64, ANTAROX 31R1, ANTAROX BL214, RHODAFAC ASI, ALKAMULS 400DO, ANTAROX AG/5, and GEROPON BIS-SODICO 2 (Rhodia Inc., Cranbury, N.J.). Other existing products tested include those sold under the trade names EMULSOTRON JXZ and WITBREAK DRI, among others.

Table 1 shows various anionic and nonionic surfactants and the percent water separation achieved with each at a concentration of 2000 ppm, 30 minutes elapsed time, at room temperature. "Y" represents that separation was observed but no precise value was collected.

TABLE 1

| ID No. | Surfactant trade name | General chemistry | % water separation 2000 ppm level 30 min at room temp |
|---|---|---|---|
| 5 | Rhodoclean HP | nopol-alkoxylate | 100 |
| 9 | Geropon SDS | sulfosuccinate (powder) | 100 |
| 9G | Geropon GR/7 | sulfosuccinate (in solvent) | 100 |
| 11 | Soprophor BSU | tristyrylphenol ethoxylate | Y |
| 12 | Soprophor S/40P | tristyrylphenol ethoxylate | Y |
| 16 | Antarox L64 | EO-PO copolymer | 100 |
| 17 | Antarox 31R1 | EO-PO copolymer | 100 |
| 18 | Antarox BL214 | EO-PO copolymer | 100 |
| 19 | Rhodafac ASI | phosphonic acid | 100 |
| 20 | Commercial surfactant | Commercially available sample | 100 |
| 21 | LPA | laurylphosphonic acid | Y |
| 22 | Emulsotron JXZ | oxyalkylated phenolic resins | 100 |
| 23 | Alkamuls 400DO | PEG400-dioleate | 100 |
| 28 | Witbreak DRI | polymerized polyols | 100 |
| 32 | Antarox AG/5 | Modified alkanoamide | 100 |
| 33 | Geropon Bis-sodico 2 | sulfosuccinate | Y |

Figure 1:
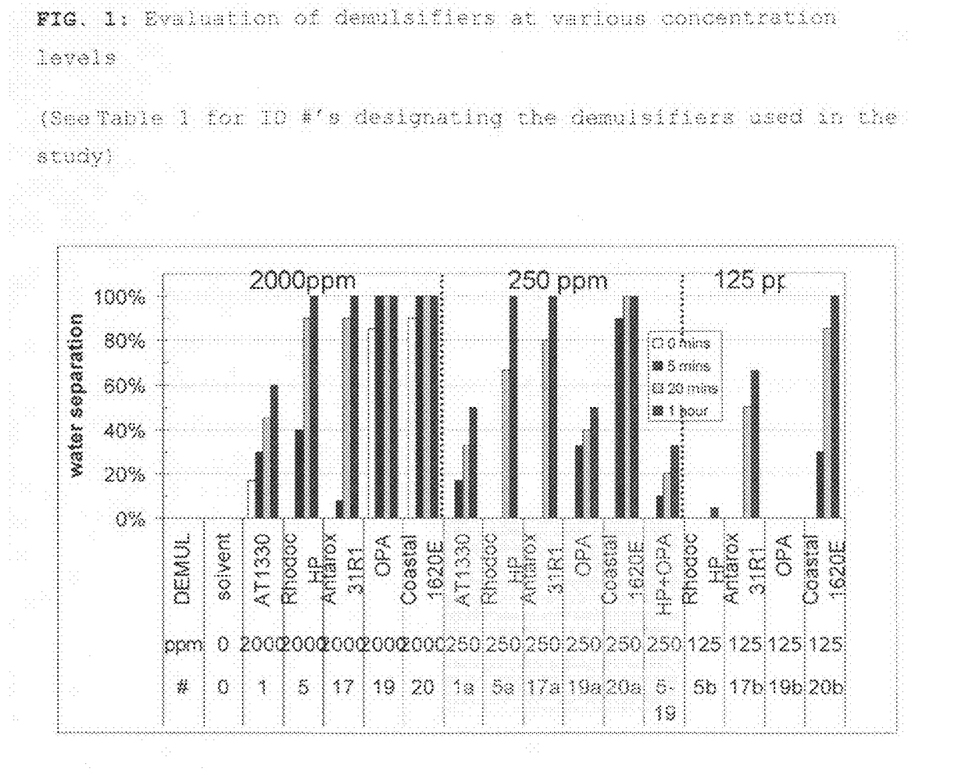
FIG. 1 depicts the effectiveness of select demulsifiers at various concentrations and elapsed times at room temperature.

FIG. 1 shows how chosen products in Table 1 separate crude oil at different elapsed times at room temperature compared to a commercial surfactant/demulsifier. Three different concentration levels are shown: 2000 ppm, 250 ppm, 125 ppm. Measurements were taken at elapsed times of 0 minutes, 5 minutes, 20 minutes, and 60 minutes. The numbers along the x-axis refer to the ID Nos. in Table 1, thereby identifying which demulsifier or combination of demulsifiers was used.

Table 2 shows how different mixtures of surfactants perform as demulsifiers. The data was taken at a concentration level of 250 ppm at room temperature at 0 minutes, 1 minute, 5 minutes, and 60 minutes elapsed times. Interface and water layer clarity were observed visually.

Figure 2:
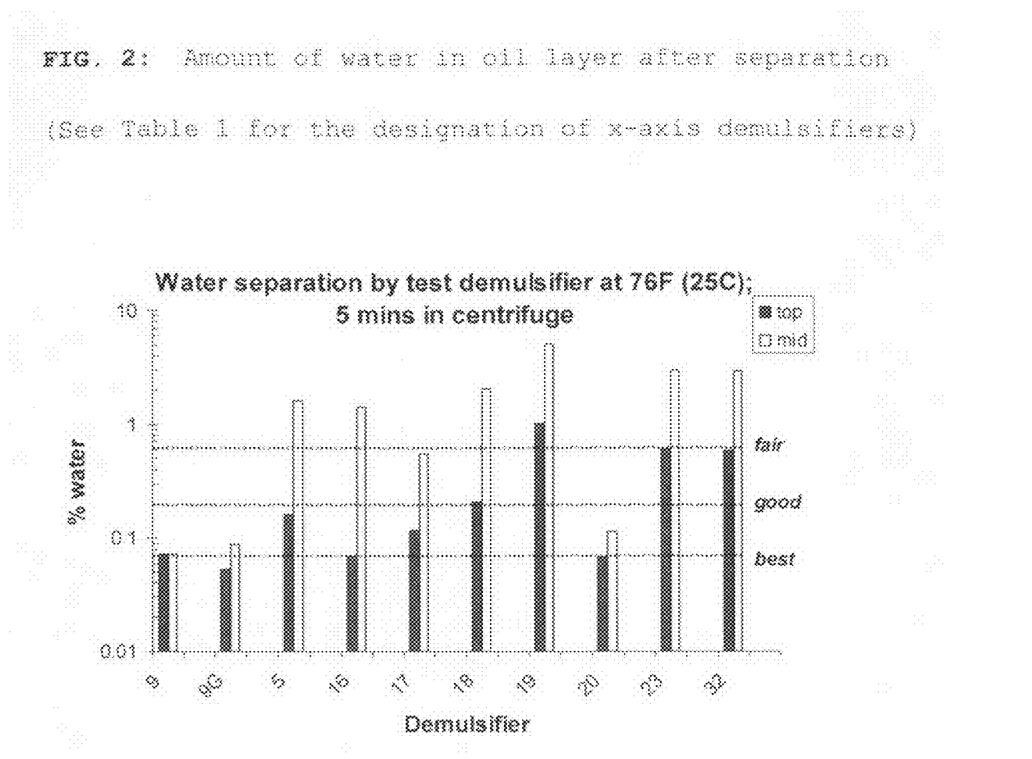
FIG. 2 depicts the percentage of water remaining in an oil-in-water emulsion after separation by using select demulsifiers.

FIG. 2 shows the percentage of water remaining in the oil layer after separation, specifically the residual water remaining in the top and mid-layer levels of the separated oil. Measurements were taken for the top and middle layers after 5 minutes elapsed time in the centrifuge at 76° F. (25° C.). The numbers along the x-axis refer to the ID Nos. in Table 1, thereby identifying which demulsifier or combination of demulsifiers was used.

Several existing solvent bases were screened to determine the potential for novel demulsifying compositions for inverse crude oil emulsions. Such solvent bases were then mixed with one or more demusifiers described herein and compared to demulsifiers in existing commercial solvent bases. Products tested include those sold under the trade names RHODOCLEAN HP, ANTAROX BL225, RHODASURF 91-6, DURAPHOS EHAP, ALBRITE IOAP, RHODOFAC ASI, ABEX 3010, ALKAMUS 400-DO (Rhodia Inc., Cranbury, N.J.). Other existing products tested include those sold under the trade names EMULSOTRON JXZ and WITBREAK DRI. Solvent bases tested include the dibasic ester blends sold under the trade names RHODIASOLV IRIS, RHODIASOLV DEE and DV8214 (Rhodia Inc., Cranbury, N.J.).

It was observed that changing the solvent base from existing commercial solvent base to certain solvent bases described herein show unexpected boosted performances for some demulsifiers. It was generally expected that changing the solvent bases would have no effect or at most a minimal effect on demulsifier performance.

TABLE 2

Surfactant blends as demulsifiers at 250 ppm levels.

| ID No. | Products | ppm | 0 min | 1 min | 5 min | 60 min | interface | Water layer |
|---|---|---|---|---|---|---|---|---|
| 0 | Solvent | 0 | 0% | 0% | 0% | 0% | — | — |
| 9a | Geropon SDS | 250 | 93% | 100% | 100% | 100% | sharp | Clear |
| 5-9a | Rhodoclean HP + Geropon SDS | 250 | 50% | 100% | 100% | 100% | hazy | Clear |
| 9-17a | Geropon SDS + Antarox 31R1 | 250 | 75% | 100% | 100% | 100% | sharp | Clear |
| 9-18a | Geropon SDS + Antarox BL214 | 250 | 83% | 100% | 100% | 100% | sharp | Clear |
| 9-23a | Geropon SDS + Alkamuls 400DO | 250 | 50% | 75% | 83% | 100% | hazy | Clear |
| 9-32a | Geropon SDS + Antarox AG/5 | 250 | 33% | 57% | 83% | 100% | hazy | Clear |
| 20a | Commercial surfactant/ demulsifier | 250 | 50% | 100% | 100% | 100% | sharp | Turbid |

| LEGEND | | | |
|---|---|---|---|
| * INTERFACE | | ** CLARITY | |
| 5 | S—sharp | 5 | C—clear |
| 4 | T—tiny globules | 4 | D—dirty |
| 3 | P—padding | 3 | D+—more dirty |
| 2 | R—rag | 2 | B—bad, water visible |
| 1 | W—wave | 1 | B+—very bad |
| 0 | —none | 0 | —none |

The data from tables 3-6 was taken at a concentration level of 250 ppm at room temperature. Water separation after 4 hrs, interface and water layer clarity were observed visually.

TABLE 3

DOSE: 250 PPM
TEMP: 25 C.

| | | Xylene/methanol solvent | | |
|---|---|---|---|---|
| # | Name | % Water Separation (4 hrs) | Interface* | Clarity** |
| 1 | Antarox L-64 | 75 | 2 | 4 |
| 2 | Antarox BL214 | 0 | 0 | 1 |
| 3 | Antarox AG/5 | 100 | 5 | 5 |
| 4 | Alkamuls 400DO | 100 | 5 | 4 |
| 5 | Abex 3010 | 75 | 2 | 2 |
| 6 | EO-PO | 100 | 3 | 3 |
| 7 | EO-PO | 100 | 2 | 2 |
| 8 | LaurylPA | 0 | 0 | 1 |
| 9 | EHPA | 0 | 0 | 0 |
| 10 | Antarox BL225 | 75 | 2 | 2 |
| 11 | Rhodoclean ASP | 75 | 2 | 2 |
| 12 | Rhodoclean MSC | 90 | 3 | 3 |
| 13 | Rhodoclean HP + BL225 | 0 | 0 | 0 |
| 14 | Rhodoclean HP + Rhodasurf 91-6 | 0 | 0 | 0 |
| 15 | Antarox L62LF | 25 | 1 | 2 |
| 16 | Antarox 25R2 | 0 | 1 | 2 |
| 17 | EHAP | 0 | 0 | 0 |
| 18 | IOAP | 0 | 0 | 0 |
| 19 | Commercial Surfactant/demulsifier | 100 | 5 | 4 |
| 20 | Rhodoclean HP | 10 | 1 | 1 |
| 21 | Rhodafac ASI | 5 | 0 | 1 |
| 22 | Antarox 31R1 | 10 | 0 | 2 |
| 23 | Pentex 99 | 100 | 4 | 4 |
| 24 | Dissolvan 3245 | 100 | 4 | 5 |
| 25 | blank | 0 | 0 | 0 |

The commercially available xylene/methanol blend was used as a baseline comparison against the various solvent bases described herein.

TABLE 4

Demulsifier performance in Rhodiasolv IRIS at 250 ppm
DOSE: 250 PPM
TEMP: 25 C.

| | | Rhodiasolv IRIS | | |
|---|---|---|---|---|
| # | Name | % Water Separation (4 hrs) | Interface* | Clarity** |
| 13 | Rhodoclean HP + Antarox BL225 | 50 | 2 | 2 |
| 14 | Rhodoclean HP + Rhodasurf 91-6 | 50 | 2 | 2 |
| 20 | Rhodoclean HP | 40 | 2 | 2 |

As compared to the commercially available xylene/methanol solvent base, Rhodoclean HP used alone and in combination with other surfactants (e.g., with Antarox BL225 and Rhodasurf 91-6) showed improved performance when using Rhodiasolv IRIS. For example, the Demulsifier #13 combination comprised, based on the total weight of the combination, from about 5% to about 95% Rhodoclean HP and from about 95% to about 5% Antarox BL225. The Demulsifier #14 combination comprised, based on the total weight of the combination, from about 5% to about 95% Rhodoclean HP and from about 95% to about 5% Rhodasurf 91-6. Demulsifier #20 comprised only Rhodiasolv HP.

Specifically, these demulsifiers and demulsifier combinations unexpectedly showed improved performance in the Rhodiasolv IRIS solvent base, with Demulsifier #13 exhibiting 50% water separation, a 2 with respect to the clarity scale and a 2 with respect to the interface scale. Similarly, Demulsifier #14 exhibited 50% water separation, a 2 with respect to the clarity scale and a 2 with respect to the interface scale. Further, Demulsifier #20 exhibited 40% water separation, a 2 with respect to the clarity scale and a 2 with respect to the interface scale.

In comparison, Demulsifier #13 in the xylene-methanol solvent base exhibited 0% water separation, a 0 with respect to the clarity scale and a 0 with respect to the interface scale. Likewise, Demulsifier #14 in the xylene-methanol solvent base exhibited 0% water separation, a 0 with respect to the clarity scale and a 0 with respect to the interface scale. Further, Demulsifier #20 in the xylene-methanol solvent base exhibited 10% water separation, a 1 with respect to the clarity scale and a 1 with respect to the interface scale.

TABLE 5

Demulsifier performance in Rhodiasolv DEE at
250 ppm
DOSE: 250 PPM
TEMP: 25 C.

| | | Rhodiasolv DEE | | |
|---|---|---|---|---|
| # | Name | % Water Separation (4 hrs) | Interface* | Clarity** |
| 5 | Abex 3010 | 100 | 5 | 5 |
| 17 | Duraphos EHAP | 100 | 3 | 4 |
| 18 | Albrite IOAP | 100 | 3 | 4 |
| 21 | Rhodafac ASI | 100 | 4 | 3 |

As compared to the commercially available xylene/methanol solvent base, the anionic surfactants described herein, in particular, phosphate demulsifiers (e.g., Duraphos EHAP

[specifically, an alkyl phosphate ester] and Albrite IOAP [specifically, an alkyl phosphate ester]), phosphonate demulsifiers (e.g., Rhodafac ASI) and sulfate demulsifiers (e.g., Abex 3010) showed improved performance in Rhodiasolv DEE. Demulsifier #17 comprised Duraphos EHAP. Demulsifier #18 comprised Albrite IOAP. Demulsifier #21 comprised Rhodafac ASI. Finally, Demulsifier #5 comprised Abex 3010.

Specifically, these demulsifiers unexpectedly showed improved performance in the Rhodiasolv DEE solvent base, with Demulsifier #17 exhibiting 100% water separation, a 4 with respect to the clarity scale and a 3 with respect to the interface scale. Similarly, Demulsifier #18 exhibited 100% water separation, a 4 with respect to the clarity scale and a 3 with respect to the interface scale. Further, Demulsifier #21 exhibited 100% water separation, a 3 with respect to the clarity scale and a 4 with respect to the interface scale. Finally, Demulsifier #5 exhibited 100% water separation, a 5 with respect to the clarity scale and a 5 with respect to the interface scale In comparison, Demulsifier #17 in the xylene-methanol solvent base exhibited 0% water separation, a 0 with respect to the clarity scale and a 0 with respect to the interface scale. Likewise, Demulsifier #18 in the xylene-methanol solvent base exhibited 0% water separation, a 0 with respect to the clarity scale and a 0 with respect to the interface scale. Further, Demulsifier #21 in the xylene-methanol solvent base exhibited 5% water separation, a 1 with respect to the clarity scale and a 0 with respect to the interface scale. Finally, Demulsifier #5 in the xylene-methanol solvent base exhibited 75% water separation, a 2 with respect to the clarity scale and a 2 with respect to the interface scale.

TABLE 6

Demulsifier performance in DV8214 at 250 ppm
DOSE: 250 PPM
TEMP: 25 C.

| # | Name | Water Separation (4 hrs) | Interface* | Clarity** |
|---|---|---|---|---|
| 4 | Alkamuls 400DO | 100 | 5 | 5 |
| 6 | Gly-EOPO1 | 100 | 4 | 4 |

As compared to the commercially available xylene/methanol solvent base, EO-PO surfactants (e.g., glycerol-based EQ-PO and Alkamuls 400-DO) showed improved performance in DV8214. Demulsifier #4 comprised Alkamuls 400-DO, while demulsifier #6 comprised EO-PO copolymer.

Specifically, these demulsifiers unexpectedly showed improved performance in the DV8214 solvent base, with Demulsifier #4 exhibiting 100% water separation, a 5 with respect to the clarity scale and a 5 with respect to the interface scale. Demulsifier #6 exhibited 100% water separation, a 4 with respect to the clarity scale and a 4 with respect to the interface scale.

In comparison, Demulsifier #4 in the xylene-methanol solvent base exhibited 100% water separation, a 4 with respect to the clarity scale and a 5 with respect to the interface scale. Similarly, Demulsifier #6 in the xylene-methanol solvent base exhibited 100% water separation, a 3 with respect to the clarity scale and a 3 with respect to the interface scale.

It is understood that while the present invention has applications in the oilfield industry—for example, in the breakup of crude oil emulsions—the present invention may also have applications in other industries, such the pharmaceutical industry, health industry, beauty and personal care industries, etc.

Although the invention herein has been described with reference to particular embodiments and examples, it is to be understood that these embodiments are merely illustrative of the principles and applications of the present invention. Other embodiments have been suggested and still others may occur to those skilled in the art upon a reading and understanding of the specification. It is intended that all such embodiments be included within the scope of this invention. It is therefore to be understood that numerous modifications may be made to the illustrative embodiments and that other arrangements may be devised without departing from the spirit and scope of the present invention as defined by the claims.

We claim:
1. A demulsifying composition comprising:
   (a) an anionic surfactant selected from the group consisting of alkylsulfosuccinates, alkyl phosphate esters, alkylphosphonic acids, salts thereof, and combinations thereof;
   (b) a nonionic surfactant selected from the group consisting of ethylene oxide/propylene oxide copolymers, ethoxylated fatty acid esters of polyethylene glycol, terpene alkoxylates, alcohol ethoxylates, modified alkanomides, and combinations thereof; and
   (c) a solvent base composition comprising a blend of dibasic esters selected from the group consisting of a blend of diesters of the formulas and a blend of diesters of the formulas wherein R is methyl, ethyl, propyl, isopropyl, butyl, isobutyl, n-butyl or isoamyl.

2. The demulsifier composition of claim 1 wherein the anionic surfactant is present from about 5% to about 95% by weight of the total surfactant.

3. The demulsifier composition of claim 1 wherein the nonionic surfactant is present from about 5% to about 95% by weight of the total surfactant.

4. The demulsifier composition of claim 1 wherein the anionic surfactant is present from about 10% to about 80% by weight of the total surfactant.

5. The demulsifier composition of claim 1 wherein the nonionic surfactant is present from about 10% to about 80% by weight of the total surfactant.

6. The demulsifier composition of claim 1 wherein the anionic surfactant is sodium dialkylsulfosuccinate, wherein the alkyl group contains from about 5 to 15 carbon atoms.

7. The demulsifier composition of claim 1 wherein the anionic surfactant is selected from the group consisting of alkylphosphonic acid, laurylphosphonic acid, salts thereof, and combinations thereof.

8. The demulsifier composition of claim 1 wherein the nonionic surfactant is an ethylene oxide/propylene oxide copolymer selected from the group consisting of ethylene oxide/propylene oxide alkoxylates, ethylene oxide/propylene oxide block copolymers, and ethylene oxide/propylene oxide reverse copolymers.

9. The demulsifier composition of claim 8 wherein the nonionic surfactant is an ethylene oxide/propylene oxide block copolymer of the general formula:

(III)

wherein "m" is from about 1 to about 50, "o" and "p" are each from about 1 to about 20.

10. The demulsifier composition of claim 8 wherein the nonionic surfactant is an ethylene oxide/propylene oxide reverse polymer or copolymer of the general formula:

(IV)

wherein "m" is from about 10 to about 60, and "n" is from about 0 to about 15.

11. The demulsifier composition of claim 10 wherein "m" is about 27 and "n" is about 8.

12. The demulsifier composition of claim 8 wherein the nonionic surfactant is an ethylene oxide/propylene oxide alkoxylate having the following formula:

(V)

wherein "d" is about 5 and "e" is about 8, and $R^3$ is a hydrocarbon chain containing from about 1 to about 22 carbon atoms.

13. The demulsifier composition of claim 1, wherein the non-ionic surfactant is a terpene alkoxylate having the following formula:

(VIII)

wherein $R^6$ is methyl or ethyl, "n" is from about 20 to about 30, and "m" is from 0 to about 20.

14. The demulsifier composition of claim 13, wherein $R^6$ is methyl, "n" is from about 20 to 25, and "m" is from about 5 to about 10.

15. The demulsifier composition of claim 1 wherein the nonionic surfactant is an ethoxylated fatty acid esters of polyethylene glycol of the general formulae:

(VI)

(VII)

wherein "x" is from about 1 to about 20, $R^4$ is a hydrocarbon chain containing about 10 to 22 carbon atoms, and $R^5$ is a hydrogen or a hydrocarbon chain containing about 1 to about 20 carbon atoms.

16. The demulsifying composition of claim 1 wherein the blend comprises adducts of alcohol and linear diacids, the adducts having the formula $R^7$—OOC-A-COO—$R^7$ wherein $R^7$ is an alkyl group and A is a mixture of —(CH$_2$)$_4$—, —(CH$_2$)$_3$—, and —(CH$_2$)$_2$—.

17. The demulsifying composition of claim 1 wherein the blend comprises adducts of alcohol and linear diacids, the adducts having the formula $R^8$—OOC-A$^1$-COO—$R^9$, wherein at least part of $R^8$ and/or $R^9$ are residues of at least one linear alcohol having 4 carbon atoms, or at least one linear alcohol having at least 5 carbon atoms, and wherein A$^1$ is a linear hydrocarbon.

18. The demulsifying composition of claim 17 wherein A$^1$ comprises (i) a mixture of —(CH$_2$)$_4$—, —(CH$_2$)$_3$— and —(CH$_2$)$_2$—.

19. The demulsifying composition of claim 1 wherein the solvent base composition comprises adducts of branched diacids, the adducts having the formula $R^{10}$—OOC-A$^2$-COO—$R^{11}$ wherein $R^{10}$ and $R^{11}$ are the same or different alkyl groups and A$^2$ is a linear or branched hydrocarbon.

20. The demulsifying composition of claim 19 wherein $R^{10}$ and $R^{11}$ are independently selected from the group consisting of methyl, ethyl, propyl, isopropyl, butyl, isobutyl, n-butyl, iso-amyl, and fusel.

21. The demulsifying composition of claim 19 wherein A$^2$ comprises a mixture of —CH(CH$_3$)—CH$_2$—CH$_2$—, —CH(C$_2$H$_5$)—CH$_2$— and —(CH$_2$)$_4$—.

22. The demulsifying composition of claim 1 wherein the blend comprises:

20-28% by weight of the blend a diester of the formula 59-67% by weight of the blend a diester of formula and 9-17% by weight of the blend a diester of formula wherein R is methyl, ethyl, propyl, isopropyl, butyl, isobutyl, n-butyl or isoamyl.

23. The demulsifying composition of claim 1 wherein the blend comprises:

about 9-11% by weight of the blend a diester of the formula about 86-89% by weight of the blend a diester of the formula about 1-3% by weight of the blend a diester of the formula wherein R is methyl, ethyl, propyl, isopropyl, butyl, isobutyl, n-butyl or isoamyl.

24. A demulsifying composition comprising:
(a) either (i) an anionic surfactant selected from the group consisting of alkylsulfosuccinates, alkylphosphonic acids, salts thereof, and combinations thereof, or (ii) a nonionic surfactant selected from the group consisting of ethylene oxide/propylene oxide copolymers, ethoxylated fatty acids of polyethylene glycol, alcohol ethoxylates, terpene alkoxylates, and combinations thereof; and
(b) a solvent base composition comprising a blend of dibasic esters selected from the group consisting of a blend of diesters of the formulas and a blend of diesters for the formulas wherein R is methyl, ethyl, propyl, isopropyl, butyl, isobutyl, n-butyl or isoamyl.

25. The demulsifying composition of claim 24 wherein the anionic surfactant is sodium dialkylsulfosuccinate, wherein the alkyl group comprises about 5 to about 15 carbon atoms.

26. The demulsifying composition of claim 24 wherein the anionic surfactant is selected from the group consisting of alkylphosphonic acid, laurylphosphonic acid, salts thereof, and combinations thereof.

27. The demulsifying composition of claim 24 wherein the blend comprises adducts of alcohol and linear diacids, the adducts having the formula $R^7$—OOC-A-COO—$R^7$ wherein $R^7$ is an alkyl group and A is either (i) a mixture of —$(CH_2)_4$—, —$(CH_2)_3$—, and —$(CH_2)_2$— or (ii) a mixture of —$CH(CH_3)$—$CH_2$—$CH_2$—, —$CH(C_2H_5)$—$CH_2$— and —$(CH_2)_4$—.

28. The demulsifying composition of claim 24 wherein the solvent base composition comprises adducts of ethanol and linear diacids, the adducts having the formula $R^8$—OOC-$A^1$-COO—$R^9$, wherein at least part of $R^8$ and/or $R^9$ are residues of ethanol and wherein $A^1$ is a either (i) a mixture of —(CH$_2$)$_4$—, —(CH$_2$)$_3$—, and —(CH$_2$)$_2$— or (ii) a mixture of —CH(CH$_3$)—CH$_2$—CH$_2$—, —CH(C$_2$H$_5$)—CH$_2$— and —(CH$_2$)$_4$—.

29. The demulsifying composition of claim 24 wherein the terpene alkoxylate has the following formula:

(VIII)

wherein R$^6$ is methyl or ethyl, "n" is from about 20 to about 30, and "m" is from 0 to about 20.

30. A method for breaking an emulsion of oil and water comprising:
contacting the emulsion with a demulsifying composition comprising (a) an anionic surfactant selected from the group consisting of alkylsulfosuccinates, alkylphosphonic acids, salts thereof, and combinations thereof; (b) a nonionic surfactant selected from the group consisting of ethylene oxide/propylene oxide copolymers, ethoxylated fatty acids of polyethylene glycol, alcohol ethoxylates, terpene alkoxylates, modified alkanolamides, and combinations thereof; and (c) a solvent base composition comprising a blend of dibasic esters selected from the group consisting of a blend of diesters of the formulas and a blend of diesters for the formulas -continued wherein R is methyl, ethyl, propyl, isopropyl, butyl, isobutyl, n-butyl or isoamyl.

31. The method of claim 30 wherein the anionic surfactant is sodium dialkylsulfosuccinate, wherein the alkyl group comprises from about 5 to about 15 carbon atoms.

32. The method of claim 30 wherein the blend comprises adducts of alcohol and linear diacids, the adducts having the formula R$^7$—OOC-A-COO—R$^7$ wherein R$^7$ is an alkyl group and A is either (i) a mixture of —(CH$_2$)$_4$—, —(CH$_2$)$_3$—, and —(CH$_2$)$_2$— or (ii) a mixture of —CH(CH$_3$)—CH$_2$—CH$_2$—, —CH(C$_2$H$_5$)—CH$_2$— and —(CH$_2$)$_4$—.

33. The method of claim 30 wherein the solvent base composition comprises adducts of alcohol and diacids, the adducts having the formula R$^8$—OOC-A$^1$-COO—R$^9$, wherein at least part of R$^8$ and/or R$^9$ are residues of at least one linear alcohol having 4 carbon atoms, or at least one linear or branched alcohol having at least 5 carbon atoms, and wherein A$^1$ is either (i) a mixture of —(CH$_2$)$_4$—, —(CH$_2$)$_3$—, and —(CH$_2$)$_2$— or (ii) a mixture of —CH(CH$_3$)—CH$_2$—CH$_2$—, —CH(C$_2$H$_5$)—CH$_2$— and —(CH$_2$)$_4$—.

34. The method of claim 30 wherein the emulsion is a water-in-oil emulsion.

35. A method for breaking an emulsion of oil and water comprising contacting the emulsion with (a) a demulsifier comprising either (i) an anionic surfactant selected from the group consisting of alkylsulfosuccinates, alkylphosphonic acids, salts thereof, and combinations thereof, or (ii) a nonionic surfactant selected from the group consisting of ethylene oxide/propylene oxide copolymers, ethoxylated fatty acids of polyethylene glycol, alcohol ethoxylates, terpene alkoxylates, and combinations thereof; and (b) a solvent base composition comprising a blend of dibasic esters selected from the group consisting of a blend of diesters of the formulas and and a blend of diesters for the formulas wherein R is methyl, ethyl, propyl, isopropyl, butyl, isobutyl, n-butyl or isoamyl.

36. The method of claim 35 wherein the anionic surfactant is sodium dialkylsulfosuccinate, wherein the alkyl group comprises from about 5 to about 15 carbon atoms.

37. The method of claim 35 wherein the nonionic surfactant is an ethylene oxide/propylene oxide copolymer selected from the group consisting of ethylene oxide/propylene oxide alkoxylates, ethylene oxide/propylene oxide block copolymers, and ethylene oxide/propylene oxide reverse copolymers.

38. The method of claim 35 wherein the terpene alkoxylate has the following formula:

(VIII)

wherein $R^6$ is methyl or ethyl, "n" is from about 20 to about 30, and "m" is from 0 to about 20.

39. The method of claim 35 wherein the blend comprises adducts of alcohol and diacids, the adducts having the formula $R^7$—OOC-A-COO—$R^7$ wherein $R^7$ is an alkyl group and A is either (i) a mixture of —$(CH_2)_4$—, —$(CH_2)_3$, and —$(CH_2)_2$— or (ii) a mixture of —$CH(CH_3)$—$CH_2$—$CH_2$—, —$CH(C_2H_5)$—$CH_2$— and —$(CH_2)_4$—.

40. The method of claim 35 wherein the solvent base composition comprises adducts of alcohol and diacids, the adducts having the formula $R^8$—OOC-$A^1$-COO—$R^9$, wherein at least part of $R^8$ and/or $R^9$ are residues of at least one linear alcohol having 4 carbon atoms, or at least one linear or branched alcohol having at least 5 carbon atoms, and wherein $A^1$ is either (i) a mixture of —$(CH_2)_4$—, —$(CH_2)_3$, and —$(CH_2)_2$— or (ii) a mixture of —$CH(CH_3)$—$CH_2$—$CH_2$—, —$CH(C_2H_5)$—$CH_2$— and —$(CH_2)_4$—.

* * * * *